United States Patent
Herterich et al.

(10) Patent No.: US 7,494,172 B2
(45) Date of Patent: Feb. 24, 2009

(54) STORAGE COMPARTMENT

(75) Inventors: Anoma Herterich, Landshut (DE);
Franz Reischer, Unterdietfurt (DE);
Martin Huber, Velden/Vils (DE);
Karl-Heinz Greiβl, Neumarkt St. Veit (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 360 days.

(21) Appl. No.: 11/267,946

(22) Filed: Nov. 4, 2005

(65) Prior Publication Data
US 2006/0131913 A1 Jun. 22, 2006

(30) Foreign Application Priority Data
Nov. 4, 2004 (DE) .................. 10 2004 053 322

(51) Int. Cl.
*B60N 3/12* (2006.01)
(52) U.S. Cl. .................................................. 296/37.8
(58) Field of Classification Search ................ 296/24.3, 296/24.4, 24.44, 37.1, 37.8, 37.12
See application file for complete search history.

(56) References Cited

U.S. PATENT DOCUMENTS

| | | | |
|---|---|---|---|
| 2,796,310 A | | 6/1957 | Anderson |
| 3,473,680 A | * | 10/1969 | Downer ..................... 414/462 |
| 5,072,989 A | * | 12/1991 | Spykerman et al. .... 297/188.16 |
| 5,800,005 A | * | 9/1998 | Arold et al. .............. 296/37.12 |
| 6,024,395 A | * | 2/2000 | Kang ......................... 296/37.8 |
| 6,349,913 B1 | * | 2/2002 | Jankowski ............... 248/311.2 |
| 6,663,155 B1 | * | 12/2003 | Malone et al. ............. 296/37.8 |
| 7,264,291 B2 | * | 9/2007 | Radu et al. .............. 296/24.34 |
| 7,318,615 B2 | * | 1/2008 | Schneider .................. 296/37.1 |
| 2004/0245796 A1 | * | 12/2004 | Maierholzner ............. 296/37.8 |
| 2007/0069544 A1 | * | 3/2007 | Sturt et al. ................. 296/37.8 |
| 2007/0236036 A1 | * | 10/2007 | Downey .................... 296/37.1 |

* cited by examiner

*Primary Examiner*—H Gutman
(74) *Attorney, Agent, or Firm*—Wolf, Greenfield, & Sacks, P.C.

(57) ABSTRACT

A compartment, such as a glove compartment of a motor vehicle includes a lid and a movable drawer. A lever system is operatively coupled between the lid and the drawer such that upon opening or closing the lid, the drawer is moved. The lever system may provide a transmission ratio so that optimum adaptation to the spatial conditions is possible. Furthermore, it is possible to pull the storage drawer relatively far forwards even when the compartment lid is only opened slightly.

16 Claims, 3 Drawing Sheets

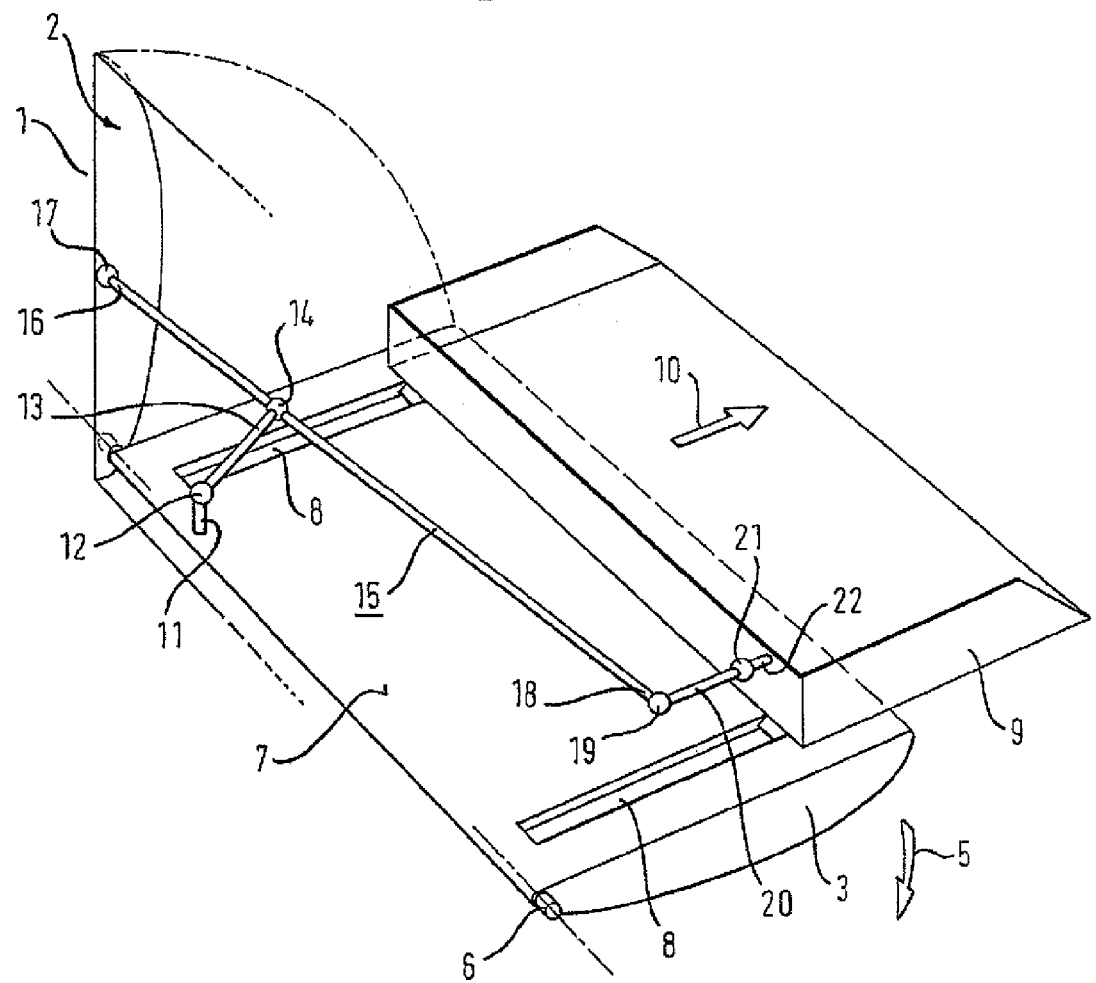

US 7,494,172 B2

STORAGE COMPARTMENT

BACKGROUND

1. Field

Aspects of the invention relate to compartments for storing objects, and more particularly to compartments with movable drawers for storing objects in motor vehicles.

2. Discussion of Related Art

Glove compartments of a motor vehicles with movable drawers are known from U.S. Pat. No. 2,796,310. Here, a lid is attached to the underside of the compartment by a hinge. The drawer in the compartment can be moved forward along guide rails inside of the glove compartment by the motion of a hinged lid. The side walls of the drawer are attached to the lid by a pivoted arm. When the lid is opened, the arm slides the drawer in the guides and causes the drawer to be moved toward an open position to provide access to the drawer. However, the arrangement shown may not provide good access to contents of the drawer if the lid is only partially opened.

SUMMARY

In one illustrative embodiment, a compartment lid of a motor vehicle is provided. The lid includes a storage drawer which is guided in a guide, and a driving element for driving the storage drawer forwards on opening the lid. The driving element is attached to the lid on one portion and is connected to the storage drawer on another portion. The driving element is part of a transmission lever system which is permanently supportable outside the lid.

In another illustrative embodiment, a storage compartment apparatus is provided. The apparatus includes a lid that is movable between a closed position and a fully opened position. The lid has a guide. The apparatus further includes a storage drawer guided by the guide and a lever system including a driving element for driving the storage drawer along the guide when the lid is moved between the closed and fully opened positions. One portion of the driving element is connected to the lid and another portion of the driving element is connected to the storage drawer.

In yet another illustrative embodiment, an apparatus for a storage compartment is provided. The apparatus includes a lid movable to a plurality of positions between a closed position and a fully open position, and a movable storage drawer operatively coupled to the lid. The lid and storage drawer are operatively coupled such that movement of the lid into any one of the plurality of positions between the closed position and the fully open position causes a corresponding movement of the drawer so that access to the drawer can be obtained even when the lid is not in the fully open position.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 3 is a schematic perspective view of the inside of the glove compartment of FIG. 2 when the lid is in a fully opened condition.

DETAILED DESCRIPTION

Figure 1:
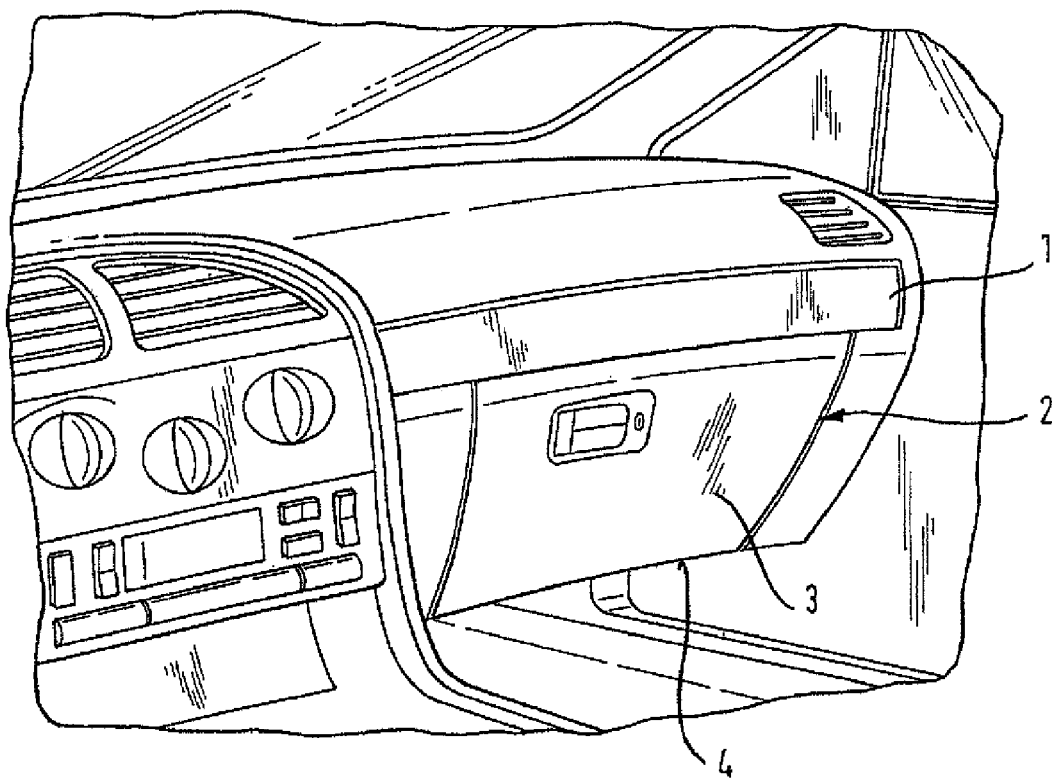
FIG. 1 is a schematic perspective view of a compartment, such as a glove compartment located in the dashboard of a motor vehicle.

According to one aspect of the invention, a storage compartment, such as a glove compartment of a motor vehicle, includes a mechanism that provides access to contents of the storage compartment, even when limited space such as the lack of space in the knee room of a motor vehicle prevents a compartment lid from being fully opened.

In one illustrative embodiment a compartment lid, such as a glove compartment of a motor vehicle, has a storage drawer that is guided by a guide. A driving element for driving the storage drawer forward when the lid is opened is attached to the lid at a first connection and is connected to the storage drawer at a second connection. The driving element is designed as a part of a transmission lever system which may be permanently supported outside the lid.

In some embodiments, the distance that the storage compartment moves relative to the position of the compartment lid (that is, the transmission ratio) can be adjusted. Here, the transmission ratio can be set to suit the respective local conditions of a given compartment to ensure that the storage drawer moves open even if the lid is only slightly opened. This can prove beneficial, especially where only slight opening of the lid is possible due to restricted spatial conditions.

In some embodiments, the lever system has a driving rod connected to the storage drawer by way of a lateral rod that is permanently attached at one end outside of the lid and that is connected at the other end directly or indirectly mounted on the storage drawer. The driving rod can be adjustably attached to the lateral rod and as a result it may be possible to adjust a desired transmission ratio to accommodate structural and/or spatial conditions of the compartment. By altering the lever ratios on the lateral rod, it may be possible to vary the desired transmission ratio to suit the spatial conditions of a particular application. Although the transmission ratio may be adjusted, it should be appreciated that the present invention is not limited in this respect.

In one embodiment, the driving rod may be rigidly fixed to the lid and flexibly connected to the lateral rod by way of a pull rod. In a similar manner, an end of the lateral rod can be flexibly connected to the storage drawer by a push rod.

The guide for the storage drawer may be provided at least partially on the interior surface of the lid. In one embodiment, movement of the storage drawer as soon as the lid opening process commences is possible, with the result being that the storage drawer is accessible when the lid has just initially been opened.

In one embodiment, the lever system may be disposed behind the drawer when seen from the opening direction of the storage drawer. However, it is also possible for the lever system to be disposed laterally with respect to the drawer, as the present invention is not limited in this respect.

In one embodiment, the lateral rod of the lever system may be aligned parallel to the hinge axis of the lid, which may be beneficial when space is limited. In one embodiment, the hinge axis is disposed on the lower edge of the compartment to be closed.

Although the embodiments herein are described with reference to a motor vehicle glove compartment, the present invention is not limited in this respect, as the arrangement may be used with other storage compartments.

Motor vehicles often include glove compartments 2 located in a dashboard 1 that are closed by a compartment lid 3, as shown in the diagram of FIG. 1. The illustrated compartment lid 3 has a hinge axis at lower edge 4 of the glove compartment. The lid can rotate through a plurality of positions between a closed position and a fully open position about the hinge axis to open and close the compartment. Compartment lid 3 is shown in FIG. 1 as being at a relatively steep angle and, in some applications, it may be that the lid can only be opened to a limited extent due spatial restrictions, such as restrictions imposed by the knees of a passenger in the motor vehicle. Although the compartment lid is shown disposed generally vertically, the present invention is not limited in this respect, as other suitable orientations may be provided.

Access to the interior of the glove compartment so that one can insert items into the glove compartment as well as to take items out, even when the lid can only be opened a small amount due to spatial restrictions, may be desirable. In some instances, the angle of opening may result in an access aperture as little as 9 cm or smaller from the upper edge of the lid to the dashboard. Still, in some applications like that shown in FIG. 1, the angle of opening of the lid may be as small as 10-12 degrees, or smaller, due to spatial restrictions within the car.

Figure 2:
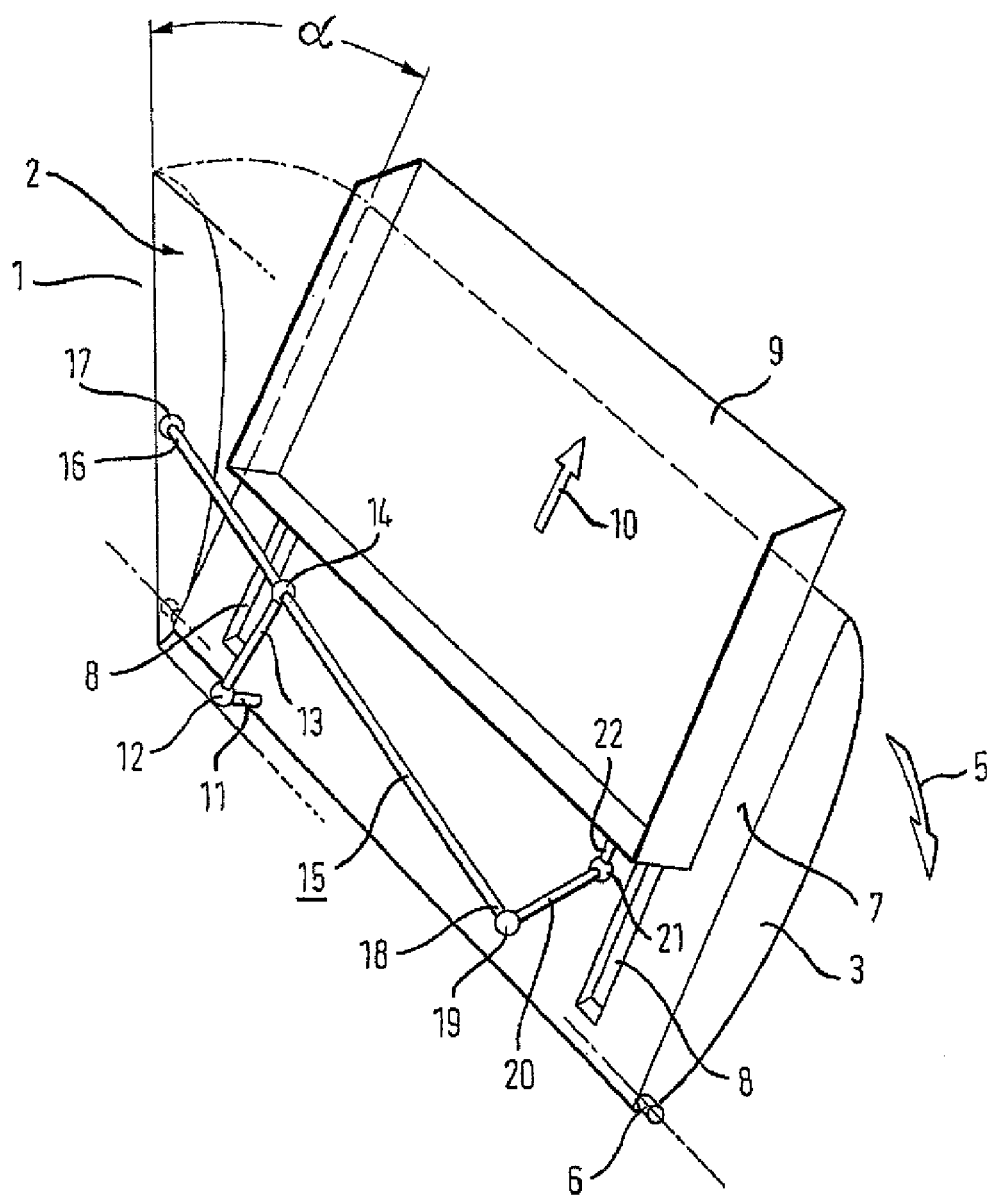
FIG. 2 is a schematic perspective view of the inside of the glove compartment when the lid is in a slightly opened condition.

In some embodiments, like that shown in FIG. 2, a storage drawer is included in the glove compartment. The storage drawer can move forward, along arrow 10, toward the access aperture when the lid of the compartment is opened as shown by arrow 5. In this regard, access is provided to contents of the compartment even when the when the lid is opened only by a relatively small angle α.

In the embodiment of FIG. 2, compartment lid 3 is opened and closed around a hinge axis 6, which in one embodiment is essentially horizontal. Guides 8 located on an inner surface 7 of the compartment lid 3 guide the drawer 9 in the direction of arrow 10 when the compartment lid 3 is opened. In the diagram in FIG. 2 the drawer is already projecting beyond the top edge of compartment lid 3 to provide access for the insertion and removal or items. This is possible as the drawer in this case is disposed so as to be movable in guides which are located on the inside of compartment lid 3 and thus the compartment lid does not have to be opened completely in order to enable the drawer to be pushed outwards.

FIG. 2 also shows an embodiment of a driving mechanism that moves the storage drawer 9 in the forward direction when the lid is opened. The driving mechanism includes a driving rod 11 located in the vicinity of the hinge axis 6. As shown, the driving rod is rigidly attached to inner surface 7 of compartment lid 3. The driving rod is connected by an articulated joint, such as a universal joint 12, to a pull rod 13. The pull rod is, in turn connected by another articulated joint, such as universal joint 14, to a lateral rod 15. The lateral rod is connected at one end 16 by an articulated joint, such as a universal joint 17, to the dashboard 1. The other end 18 of the lateral rod 15 is connected by an articulated joint, such as universal joint 19, to a push rod 20. The push rod 20 is connected to the drawer 9 by another articulated joint 21 and a rod 22. Although universal joints are described, the present invention is not limited in this respect as other suitable mechanism may be employed to effect the desired movement.

As can be seen from FIG. 2, the push rod 20 is attached adjacent one side of the drawer 9 and the driving rod 11 is attached to compartment lid 3 adjacent an opposed side of the drawer. In one embodiment, the lever length between articulated joints 14 and 17 is considerably smaller than the lever length between articulated joints 14 and 19. This configuration results in small opening angles of the compartment lid 3 enabling a relatively large forward movement of the drawer (that is, the illustrated driving mechanism has a high transmission ratio). In other embodiments, the transmission ratio can be smaller or larger. Still, in some embodiments, the transmission ratios can be adjusted at will as is desirable and necessary depending on the space and structural conditions.

FIG. 3 shows the lid completely open insofar as such complete opening is allowed by the spatial constraints around the lid. In FIG. 3, the lever ratios and the transmission ratio are adjusted to allow a complete pull out of the drawer when the lid reaches a full opening angle α.

In the arrangement described, the lever system requires relatively little space and is the main component of the lid, apart from an attachment point 17 on the dashboard for the lateral rod 15.

Due to the downward movement of the compartment lid around hinge axis 6 in the direction of arrow 5, the driving rod also moves which brings about a pivoting movement of lateral rod 15 around articulated joint 17. This movement is transferred according to the transmission ratio to the push rod 20 and brings about a pulling out or pushing out of drawer 9 in the direction of arrow 10.

As a result of the storage drawer moving outwards, it is possible to utilize the storage space in the glove compartment to greater effect than is possible in conventional glove compartments. This is particularly the case in applications where there is a limited range of access between the dashboard and the compartment lid. The lever system enables simple manufacture and installation. The construction and likewise the function is uncomplicated and not dependent on electricity.

The invention can be used wherever there should be a possibility of making optimum use of the interior or the storage despite only limited opening of a lid.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A compartment lid of a motor vehicle, the lid comprising:
   a storage drawer which is guided in a guide; and
   a driving element for driving the storage drawer forwards on opening the lid, wherein the driving element is attached to the lid on one portion and is connected to the storage drawer on another portion, the driving element being part of a transmission lever system which is supported outside the lid, wherein in the lever system a driving rod is connected to the storage drawer by way of a lateral rod, which lateral rod is permanently attachable with a first end outside the lid and which is attached with a second end directly or indirectly on the storage drawer, whereby the driving rod is attachable to the lateral rod at a location between the first and second ends, thereby allowing a pre-set transmission ratio to be adjusted.

2. The compartment lid according to claim 1, wherein the driving rod is rigidly fixed on the lid and flexibly connected to the lateral rod by way of a pull rod.

3. The compartment lid according to claim 1, wherein the second end of the lateral rod is flexibly connected to the storage drawer by a push rod.

4. The compartment lid according to claim 1, wherein the lever system is disposed behind the drawer as seen from the direction of opening of the storage drawer.

5. The compartment lid according to claim 1, wherein the lever system is disposed laterally to the storage drawer in the opening and closing direction or pushing direction of the storage drawer.

6. The compartment lid according to claim 1, wherein the lateral rod of the lever system runs essentially parallel to a hinge axis of the lid.

7. The compartment lid according to claim 6, wherein the hinge axis of the lid is disposed in the assembled condition on a lower edge of the compartment to be closed.

8. A compartment lid of a motor vehicle, the lid comprising:
 a storage drawer which is guided in a guide; and
 a driving element for driving the storage drawer forwards on opening the lid wherein the driving element is attached to the lid on one portion and is connected to the storage drawer on another portion, the driving element being part of a transmission lever system which is supported outside the lid, wherein the guide for the storage drawer is provided at least in part on an inner surface of the lid.

9. A storage compartment apparatus, comprising:
 a movable lid having a guide the lid being movable between a closed position and a fully opened position;
 a storage drawer guided by the guide; and
 a transmission lever system including a driving element for driving the storage drawer along the guide when the lid is moved between the closed and fully opened positions, one portion of the driving element being connected to the lid and another portion of the driving element being connected to the storage drawer, wherein the lever system includes a driving rod connected to the storage drawer by a lateral rod that is attachable with a first end outside the lid and that is attached with a second end directly or indirectly on the storage drawer, the driving rod being attached to the lateral rod between the first and the second ends.

10. The apparatus according to claim 9, wherein the lever system has a transmission ratio defining a relationship between an opening angle of the lid and movement of the drawer, wherein the transmission ratio is adjustable.

11. The apparatus according to claim 9, wherein the driving rod is rigidly fixed on the lid and flexibly connected to the lateral rod by a pull rod.

12. The apparatus according to claim 9, wherein the second end of the lateral rod is flexibly connected to the storage drawer by a push rod.

13. A storage compartment apparatus, comprising:
 a movable lid having a guide, the lid being movable between a closed position and a fully opened position;
 a storage drawer guided by the guide; and
 a transmission lever system including a driving element for driving the storage drawer along the guide when the lid is moved between the closed and fully opened positions. one portion of the driving element being connected to the lid and another portion of the driving element being connected to the storage drawer, wherein the guide is provided at least in part on an inner surface of the lid.

14. A storage compartment apparatus, comprising:
 a movable lid having a guide, the lid being movable between a closed position and a fully opened position;
 a storage drawer guided by the guide; and
 a transmission lever system including a driving element for driving the storage drawer along the guide when the lid is moved between the closed and fully opened positions, one portion of the driving element being connected to the lid and another portion of the driving element being connected to the storage drawer, wherein the storage drawer has an open forward end and a closed rearward end, the lever system being disposed adjacent the closed rearward end.

15. An apparatus for a storage compartment, the apparatus comprising:
 a lid movable to a plurality of positions between a closed position and a fully open position;
 a movable storage drawer operatively coupled to the lid;
 wherein the lid and storage drawer are operatively coupled such that movement of the lid into any one of the plurality of positions between the closed position and the fully open position causes a corresponding movement of the drawer so that access to the drawer can be obtained even when the lid is not in the fully open position; and
 a lever system for moving the storage drawer when the lid is opened, the lever system having a first connection to the lid, a second connection to the storage drawer and a third connection to a support of the storage compartment that remains stationary when the lid is opened.

16. The compartment lid according to claim 15, wherein the lever system comprises:
 a driving rod connected to the lid at the first connection; and
 a lateral rod that provides a connection between the storage drawer and the stationary support, the driving rod connected to the lateral rod at a transmission point between the first and the second connections, wherein the transmission position is movable between the second and third connections to alter a transmission ratio of the lever system.

* * * * *